United States Patent
Rooney

(10) Patent No.: US 7,131,796 B2
(45) Date of Patent: Nov. 7, 2006

(54) DRILL AND TAP GUIDE

(76) Inventor: Bruce P. Rooney, 35704 Metcalf Rd., Louisburg, KS (US) 66053

( * ) Notice: Subject to any disclaimer, the term of this patent is extended or adjusted under 35 U.S.C. 154(b) by 48 days.

(21) Appl. No.: 10/845,901

(22) Filed: May 14, 2004

(65) Prior Publication Data

US 2005/0254911 A1    Nov. 17, 2005

(51) Int. Cl.
    *B23B 47/28* (2006.01)
(52) U.S. Cl. .............................. 408/115 R; 408/115 B
(58) Field of Classification Search ........... 408/115 R, 408/115 B, 72 B, 103, 97, 241 B
    See application file for complete search history.

(56) References Cited

U.S. PATENT DOCUMENTS

| | | | | |
|---|---|---|---|---|
| 550,767 A | * | 12/1895 | Thielscher | ................ 408/97 |
| 1,153,841 A | * | 9/1915 | Earle | ................ 408/115 R |
| 2,008,436 A | * | 7/1935 | Cross | ................ 408/110 |
| 3,804,546 A | * | 4/1974 | Boyajian | ................ 408/115 R |
| 4,005,945 A | * | 2/1977 | Gutman | ................ 408/115 B |
| 4,060,333 A | * | 11/1977 | White | ................ 408/103 |
| 4,256,420 A | * | 3/1981 | Day | ................ 408/115 R |
| 4,712,950 A | * | 12/1987 | Reynolds | ................ 408/72 R |
| 5,800,099 A | * | 9/1998 | Cooper | ................ 408/1 R |

FOREIGN PATENT DOCUMENTS

| | | | | | |
|---|---|---|---|---|---|
| CA | 2191255 | * | 5/1998 | | |
| DE | 19906355 A1 | * | 9/2000 | | |
| DE | 10231252 A1 | * | 1/2004 | | |
| EP | 1327493 | * | 7/2003 | | |
| FR | 2669251 A1 | * | 5/1992 | | |
| GB | 565456 | * | 11/1944 | ............. | 408/241 B |
| JP | 2001259912 A | * | 9/2001 | | |
| WO | WO 200074884 A1 | * | 12/2000 | | |

* cited by examiner

*Primary Examiner*—Daniel W. Howell
(74) *Attorney, Agent, or Firm*—McConwell Law Firm

(57) ABSTRACT

A drill and tap guide includes an elongated body having top and bottom surfaces, first and second sides and first and second ends. The body presents a longitudinal axis and a width dimension tapering from the first end toward the second end. A plurality of guide holes are formed through the body between the top and bottom surfaces and aligned along the longitudinal axis. The guide holes each have a unique diameter and are spaced along the longitudinal axis so that a first line generally cotangent with each of the holes is generally parallel with the first side and a second line generally cotangent with the holes is generally parallel with the second side. A positioning notch is formed in the bottom surface and generally parallel to the longitudinal axis. A method of boring a substantially perpendicular hole in a workpiece having a nonplanar sidewall includes the steps of positioning the body of the guide on the workpiece with the notch facing the sidewall of the workpiece so that the guide hole having a desired diameter is positioned over a desired position on the workpiece for the perpendicular hole. The notch aligns the body so that a perpendicular relationship exists between the guide holes and a line cotangent to the sidewall and adjacent to the guide. Once the guide is properly positioned, a hole is formed through the workpiece using a conventional drill.

11 Claims, 2 Drawing Sheets

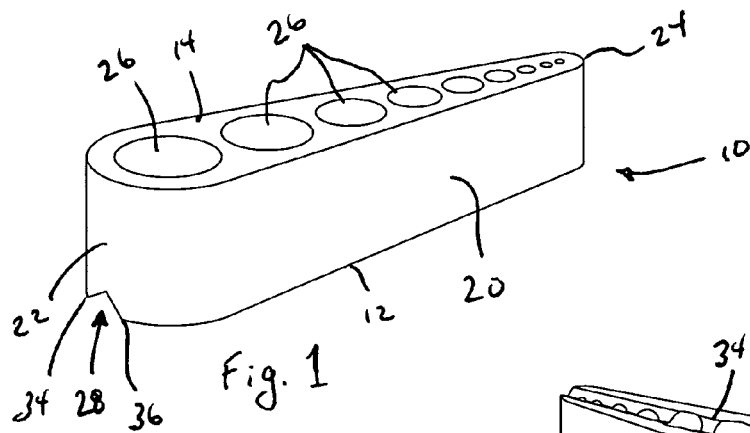
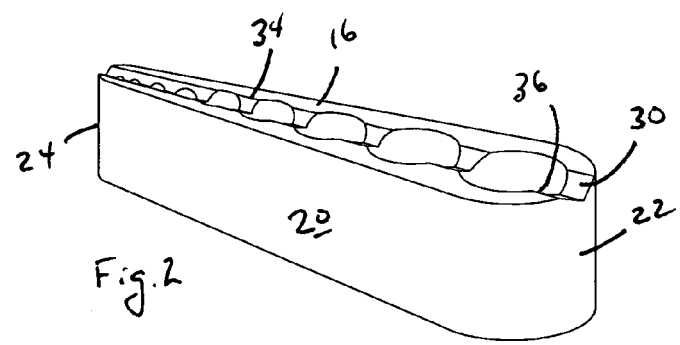
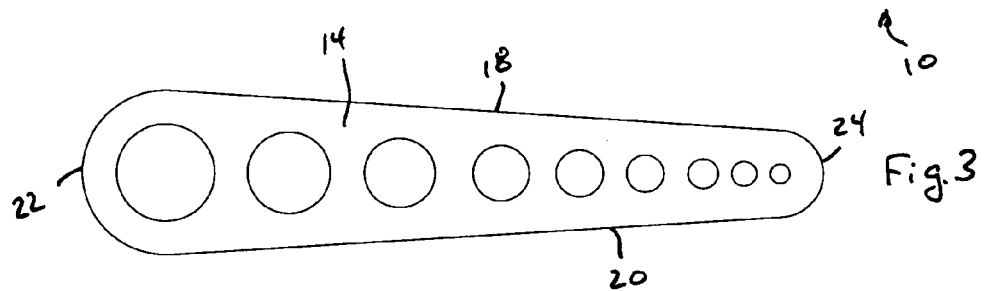
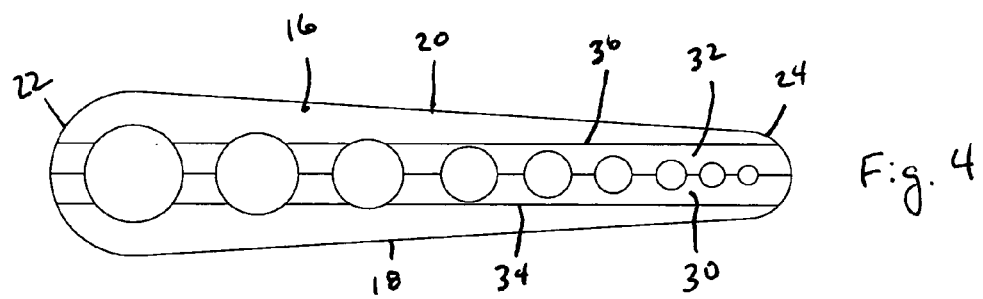
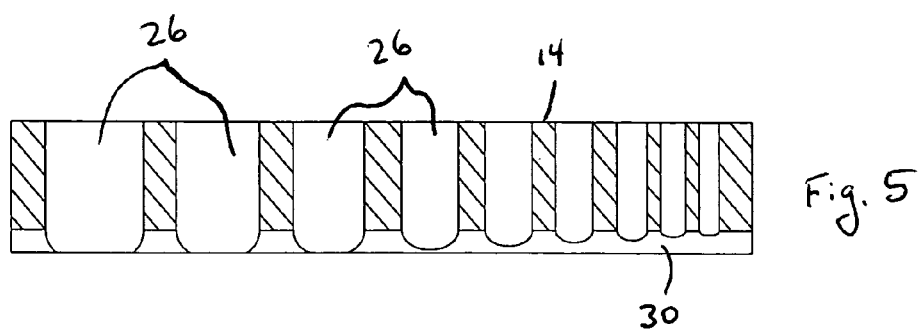

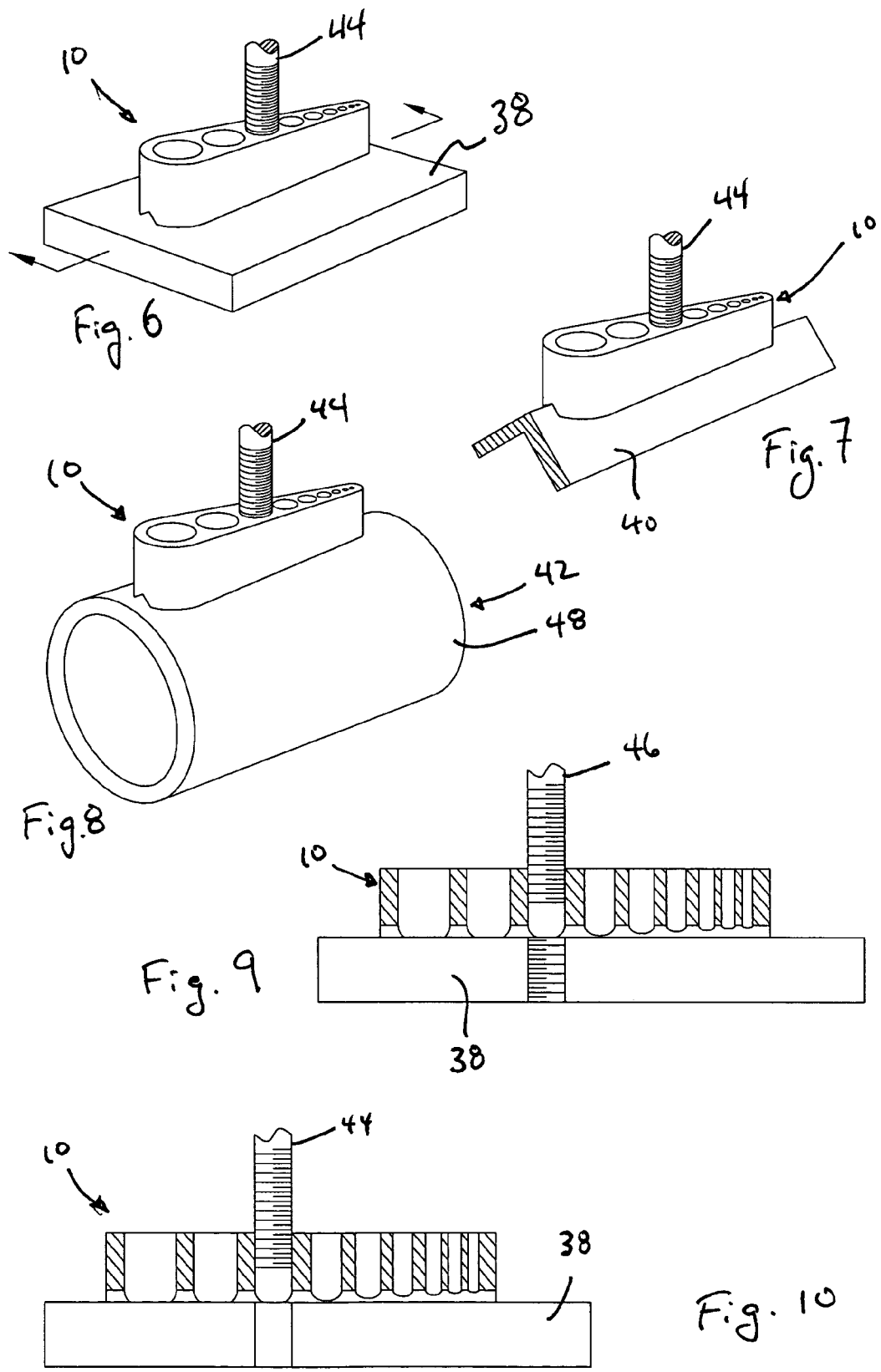

DRILL AND TAP GUIDE

BACKGROUND OF THE INVENTION

1. Field of the Invention

The present invention relates to a device used in the machining of a workpiece. More particularly, the present invention relates to a device that aids the positioning and placement of a drill or tap in drilling and tapping holes in a workpiece, including a workpiece having a nonplanar sidewall through which a hole or tap is to bored.

2. Discussion of the Prior Art

Guides have long been used in the art of drilling and tapping holes in a workpiece. Generally, a prior art guide includes a body having a plurality of guide holes of varying diameters. In use, the guide hole having the desired diameter is positioned by hand over the place on the workpiece where the hole is to be drilled or the tap made. A user then holds the guide in place with one hand while drilling the hole using a hand powered drill with the other hand.

Once such prior art guide is depicted in U.S. Pat. No. 4,589,806 to Rotta, Jr. (the '806 patent). The '806 patent discloses a guide having a body including four radial arms having guide holes at the distal ends thereof. The guide holes are of varying diameters, increasing the utility of the device.

The guide device of the '806 patent, however, is relatively wide as compared with the diameters of the guide holes, reducing the ability to position the guide device on a relatively narrow workpiece surface. The relatively large distance between the guide holes also renders the device generally difficult to position on a nonplanar surface, such as the sidewall of a cylinder. For example, when used for positioning a drill on the sidewall of a cylinder, once the appropriate guide hole is selected and positioned over the desired location on the sidewall for a drill hole or tap, much of the guide device hangs off to the side of the sidewall hole location. This may result in the guide rocking so that the guide hole is not perpendicular to the sidewall location, possibly causing the bore to be angled through the sidewall, rather than being perpendicular. In addition, the relatively small area of the guide that is in contact with the sidewall of the workpiece may result in slippage of the guide during the forming of the hole or tap possibly causing the hole to be formed in the wrong location.

U.S. Pat. No. 5,415,502 to Dahlin (the '502 patent) discloses a guide device having a generally cylindrical body with a plurality of guide holes formed through the periphery thereof. The guide holes are shown having varying diameters. As with the device shown in the '805 patent, the device of the '502 patent is relatively wide when compared to the diameter of the guide holes, resulting in the difficulties associated with boring holes in relatively narrow workplaces and on nonplanar surfaces discussed in more detail above.

There exists in the art a need to provide a drill and tap guide having a shape permitting use with drilling and tapping into workpieces of varying sizes and shapes. In addition, there exists a need for a guide having structure that assists in ensuring that a hole or tap is bored perpendicular to the surface of the workpiece adjacent to the hole or tap. Placement of the tap in alignment is important to prevent breaking the tap, a particular problem in the art of placing and using taps.

BRIEF SUMMARY OF THE INVENTION

The present invention addresses the concerns noted above. A drill and tap guide broadly comprises an elongated body having top and bottom surfaces, first and second sides and first and second ends. The body presents a longitudinal axis and a width dimension tapering from the first, relatively broad, end toward the second, relatively narrow, end.

A plurality of guide holes are formed through the body between the top and bottom surfaces and aligned along the longitudinal axis. The guide holes each have a unique diameter and are arranged widest to narrowest from the first end toward the second end. The guide holes are configured to receive a drill bit therethrough for drilling or tapping a hole in a workpiece. The guide holes are spaced along the longitudinal axis so that a first line generally cotangent with each of the holes is generally parallel with the first side and a second line generally cotangent with the holes is generally parallel with the second side.

A positioning notch is formed in the bottom surface and generally parallel to the longitudinal axis. The notch is also aligned with the guide holes so that when guide is positioned on a curved or other nonplanar surface, the notch positions the selected guide hole in a perpendicular relationship with the surface of the workpiece adjacent to the guide hole.

A method of boring a substantially perpendicular hole in a workpiece having a nonplanar sidewall includes the steps of positioning the body of the guide on the workpiece with the notch facing the sidewall of the workpiece and the desired guide hole over the sidewall of the workpiece. The notch aligns the body so that a perpendicular relationship exists between the guide holes and a line cotangent to the sidewall and adjacent to the guide hole. Once the guide is properly positioned, a hole is formed through the workpiece using a conventional drill.

Other advantages, benefits and features of the present invention will become apparent to those skilled in the art upon reading the detailed description of the preferred embodiment of the invention as discussed below.

BRIEF DESCRIPTION OF THE SEVERAL VIEWS OF THE DRAWINGS

A preferred embodiment of a drill and tap guide is described in detail below with reference to the drawing figures, wherein:

FIG. 1 is a perspective view of a drill and tap guide constructed in accordance with a preferred embodiment of the present invention;

FIG. 2 is a perspective view of the guide of FIG. 1 showing the lower face of the guide;

FIG. 3 is a plan view of the guide;

FIG. 4 is a bottom view of the guide;

FIG. 5 is a cross-section of the guide;

FIG. 6 is a perspective view of the guide positioned upon a generally planar workpiece;

FIG. 7 is a perspective view of the guide positioned upon an angled workpiece;

FIG. 8 is a perspective view of the guide positioned upon a cylindrical workpiece;

FIG. 9 is a cross-section of the guide taken along line 9—9 of FIG. 6 showing a tapped hole formed in the workpiece; and FIG. 10 is a cross-section of the guide taken along line 9—9 of FIG. 6 showing a drilled hole formed in the workpiece.

DETAILED DESCRIPTION OF THE PREFERRED EMBODIMENT

Referring now to the drawings, FIG. 1 depicts a drill and tap guide 10 constructed in accordance with a preferred embodiment of the present invention. The preferred guide 10 broadly comprises an elongated body 12 having a top surface 14 and a bottom surface 16, a first side 18 and a second side 20, and a first end 22 and a second end 24. The body 12 is constructed from a machinable metallic material and presents a longitudinal axis and a width dimension tapering from the first end 22 toward the second end 24.

A plurality of cylindrical guide holes 26 are formed through the body 12 between the top and bottom surfaces 14, 16. The holes 26 each define a guide hole axis. A line intersecting the guide hole axes is parallel with the longitudinal axis of the body 12. The guide holes 26 each have a unique diameter and are arranged widest to narrowest from the first end 22 toward the second end 24.

The guide holes 26 are spaced along the longitudinal axis so that a first line generally cotangent with the portion of each of the holes 26 nearest the first side 18 is generally parallel with the first side 18 and a second line generally cotangent with the portion of each of the holes 26 nearest the second side 20 is generally parallel with the second side 20. Therefore, the body 12 presents a generally uniform thickness between the holes 26 and the sides 18, 20. As a result, the guide 10 is relatively narrow compared with the prior art devices and may be positioned on a relatively narrow workpiece surface. Such a construction also minimizes the material needed for constructing the guide 10, helping to reduce the relative costs of a drill and tap guide, while yielding a guide 10 with a relatively large variety of sizes of guide holes 26.

A positioning notch 28 is formed in the bottom surface 16 of the body 12. The notch 28 is parallel to the longitudinal axis of the body 12. The notch 28 is also aligned with and parallel to the guide holes axes.

The notch 28 is defined by a pair of intersecting notch walls 30, 32 and presents a V-shaped cross-section. In alternative embodiments, the notch 28 may have a U-shaped or semi-circular cross-section. The notch walls 30, 32 intersect each other at about a 90° angle. The notch walls 30, 32 join the bottom surface 16 along notch ridges 34, 36.

As shown in FIG. 6, the guide 10 may be used for drilling or tapping holes in a workpiece 38 having a generally flat surface. The guide 10 is positioned so that the bottom surface 16 contacts the surface of the workpiece 38 into which the hole is to be drilled. The bottom surface 16 of the guide 10 defines a plane that is perpendicular to the guide hole axes. As a result, when the guide 10 rests on the bottom surface 16, the guide holes 26 are perpendicular to the surface of the workpiece 38. The guide is then positioned so that the guide hole 26 of the desired diameter is centered on the position where the hole is to be drilled. By pressing the guide 10 against the workpiece 38 with one hand, the guide 10 is held in place. The user then uses the other hand to drill or tap a hole in the workpiece.

Referring now to FIGS. 7 and 8, the positioning notch 28 is used to position the guide on a workpiece having a nonplanar surface. In FIG. 7, a workpiece 40 is angled. The guide 10 is positioned by placing the notch along the desired surface of the workpiece 40 to be drilled. It will be appreciated that the ridges 34, 36 of the notch 28 orient the guide 10 so that the guide holes 26 are perpendicular to the surface of the workpiece 40 where the hole is to be drilled. In this application, the hole is to be formed through the corner of an angle iron. The notch 28 of the preferred guide 10 is configured for use in drilling or tapping holes through corners of angle irons where the angle defined by the corner is greater than or equal to the angle between the walls 30, 32, in this case 90°.

FIG. 8 depicts the guide 10 positioned on a workpiece 42 having a cylindrical body. The ridges 34, 36 of the notch 28 position the guide so that the guide holes 26 are perpendicular to a line cotangent to the surface of the workpiece 42 adjacent to the location where the hole is to be drilled. As a result, the guide 10 is used to guide a drill bit 44 through the body of the workpiece 42 directly toward the longitudinal axis of the workpiece 42 forming a perpendicular hole. The guide 10 is also configured for use in tapping holes in the workpieces 38, 40, 42 using a tap 46 in the same manner as described above. It will be appreciated that the notch 28 in keeping a perpendicular orientation between the selected guide hole 26 and the line cotangent to the surface of the workpiece 42 aids in the tapping process, reducing the likelihood of the tap being broken or having its integrity otherwise compromised.

A method of boring a substantially perpendicular hole in a workpiece 42 having a nonplanar sidewall 48 includes the steps of positioning the body 12 of the guide 10 on the workpiece 42 with the notch 28 facing the sidewall 48 of the workpiece 42 and the desired guide hole 26 over the sidewall 48 of the workpiece 42. The notch 28 aligns the body 12 so that a perpendicular relationship exists between the guide holes 26 and a line cotangent to the sidewall 48 adjacent to the desired guide hole 26. Once the guide 10 is properly positioned, a hole is formed through the workpiece 42 using a conventional drill bit 44 or tap 46.

The invention has been described in the above preferred embodiment with reference to the drawing figures. It is understood that substitutions may be made and equivalents employed herein without departing from the scope of the invention as set forth in the following claims.

The invention claimed is:

1. A drill and tap guide comprising:
   an elongated body having top and bottom surfaces, first and second sides and first and second ends, the body presenting a longitudinal axis and a width dimension tapering from the first end toward the second end; and
   first and second guide holes formed through the body between the top and bottom surfaces and aligned along the longitudinal axis, the guide holes each having a unique diameter and spaced along the longitudinal axis so that a first line generally cotangent with each of the holes is generally parallel with the first side and a second line generally cotangent with the holes is generally parallel with the second side, and the relative diameters of the holes decrease from the first end toward the second end.

2. The drill and tap guide as set forth in claim 1, wherein the first and second sides span between and are generally perpendicular to the top and bottom surfaces.

3. The drill and tap guide as set forth in claim 1, further including a plurality of guide holes formed through the body between the top and bottom surfaces, the plurality of guide holes each having a unique diameter and spaced along the longitudinal axis so that the first line is generally cotangent with a first portion of each of the plurality of guide holes and the second line is generally cotangent with a second portion of each of the plurality of guide holes.

4. The drill and tap guide as set forth in claim 1, further including a positioning notch formed in the bottom surface and generally parallel to the longitudinal axis of the body.

5. The drill and tap guide as set forth in claim 4, the notch defining a pair of opposed notch ridges generally parallel to the longitudinal axis of the body, and skewed with respect to the first and second sides.

6. The drill and tap guide as set forth in claim 5, the notch presenting a generally V-shaped cross-section.

7. A drill and tap guide comprising:
an elongated body having top and bottom surfaces, first and second ends, and first and second sides, the first and second sides spanning between and generally perpendicular to the top and bottom surfaces, the body defining a longitudinal axis and including a width dimension tapering from the first end toward the second end;
first and second guide holes formed through the body between the top and bottom surfaces, the guide holes each having a unique diameter, each hole defining a hole center positioned along the longitudinal axis; and
a V-shaped positioning notch formed in the bottom surface and generally parallel to the longitudinal axis.

8. The drill and tap guide as set forth in claim 7, the notch defining a pair of opposed notch ridges generally parallel to the longitudinal axis of the body.

9. The drill and tap guide as set forth in claim 7, the first guide hole having a greater diameter than the second guide hole, the first guide hole positioned relatively closer to the first end than the second guide hole.

10. The drill and tap guide as set forth in claim 7, the guide holes each spaced along the longitudinal axis so that a first line generally cotangent with each of the holes is generally parallel with the first side and a second line generally cotangent with the holes is generally parallel with the second side.

11. The drill and tap guide as set forth in claim 10, further including a plurality of guide holes formed through the body between the top and bottom surfaces, the plurality of guide holes each having a unique diameter and spaced along the longitudinal axis so that the first line is generally cotangent with a first portion of each of the plurality of guide holes and the second line is generally cotangent with a second portion of each of the plurality of guide holes.

* * * * *